FEEDBACK SHIFT REGISTER

Filed Nov. 26, 1962 3 Sheets-Sheet 1

INVENTOR
WILLIAM K. ENGLISH
BY Samuel Lindenberg
ATTORNEY

INVENTOR.
WILLIAM K. ENGLISH
BY Samuel Lindenberg
ATTORNEY

INVENTOR
WILLIAM K. ENGLISH
BY Samuel Lindenberg
ATTORNEY

United States Patent Office 3,290,665 Patented Dec. 6, 1966

3,290,665
FEEDBACK SHIFT REGISTER

William K. English, Menlo Park, Calif., assignor to AMP Incorporated, Harrisburg, Pa., a corporation of New Jersey Filed Nov. 26, 1962, Ser. No. 240,032
9 Claims. (Cl. 340—174)

Feedback shift register circuits are shift register circuits wherein one is enabled to feedback selectively the output of the last shift register stage to one of the preceding shift register stages. These are known and used for example, in error correcting codes, the generation of psuedo random sequences, and various counting applications. This type of shift register usually consists of delay elements in each stage, with taps or connections after selected stages of delay whereby the stage contents can be fed by exclusive or circuits back to the first or intermediate stages of the register. This technique has been employed with circuits which use in each stage a magnetic ferrite core. In such circuits however, the exclusive-or circuit has had to be wired in for each stage of the register that is to be tapped. These circuits are of course, permanently wired and taps may not be changed after the register is constructed. This limits the utility of a shift register to the specific purpose for which it is wired.

An object of this invention is the provision of a programable feedback shift register.

Another object of this invention is the provision of a feedback shift register having a novel feedback arrangement.

Yet another object of the present invention is the provision of a novel feedback shift register which has more utility than those previously known.

These and other objects of the present invention may be achieved by the provision of a shift register in which a novel exclusive-or circuit is provided between stages of the shift register, which may be connected in by the operation of a switch to provide the required feedback operation, and also which operates in response to the direction of flow of current, fed-back from the last stage of the register, to achieve the exclusive-or function.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

This invention employs multi-aperture magnetic cores, whose principals of operation are well understood by those skilled in the art. These magnetic ferrite cores have substantially two states of magnetic remanence. These cores are usually shaped in the form of a ring with a central or main aperture and with one or more small or terminal apertures in the ring. The multi-aperture core is usually considered as having two principal magnetic flux paths one of which is a path around the magnetic core which includes the material between the terminal aperture and the main aperture designated as the inner leg of magnetic material. The other flux path circulates around the outer portion of the core and includes the magnetic material between the terminal aperture and the outer periphery of the core or outer leg of material.

A magnetic core is said to be in its clear state when all of the magnetic flux in the core circulates around the core in one direction. This state may also be designated as the ZERO representative state. A core is said to be in its set state when the magnetic flux circulating around one path in the core is in a direction which is different or opposite to the magnetic flux circulating in the second path of the core. At this time the core is stated to be in its ONE representative state. The prime state of the core is achieved by applying a magnetomotive force to the magnetic material around the terminal aperture which reverses the lines of flux in the magnetic material around said aperture to the direction which they have after the magnetic core has been driven to its set state. The winding, passing through the terminal aperture for effectuating priming, is designated as the prime winding.

Figure 1:
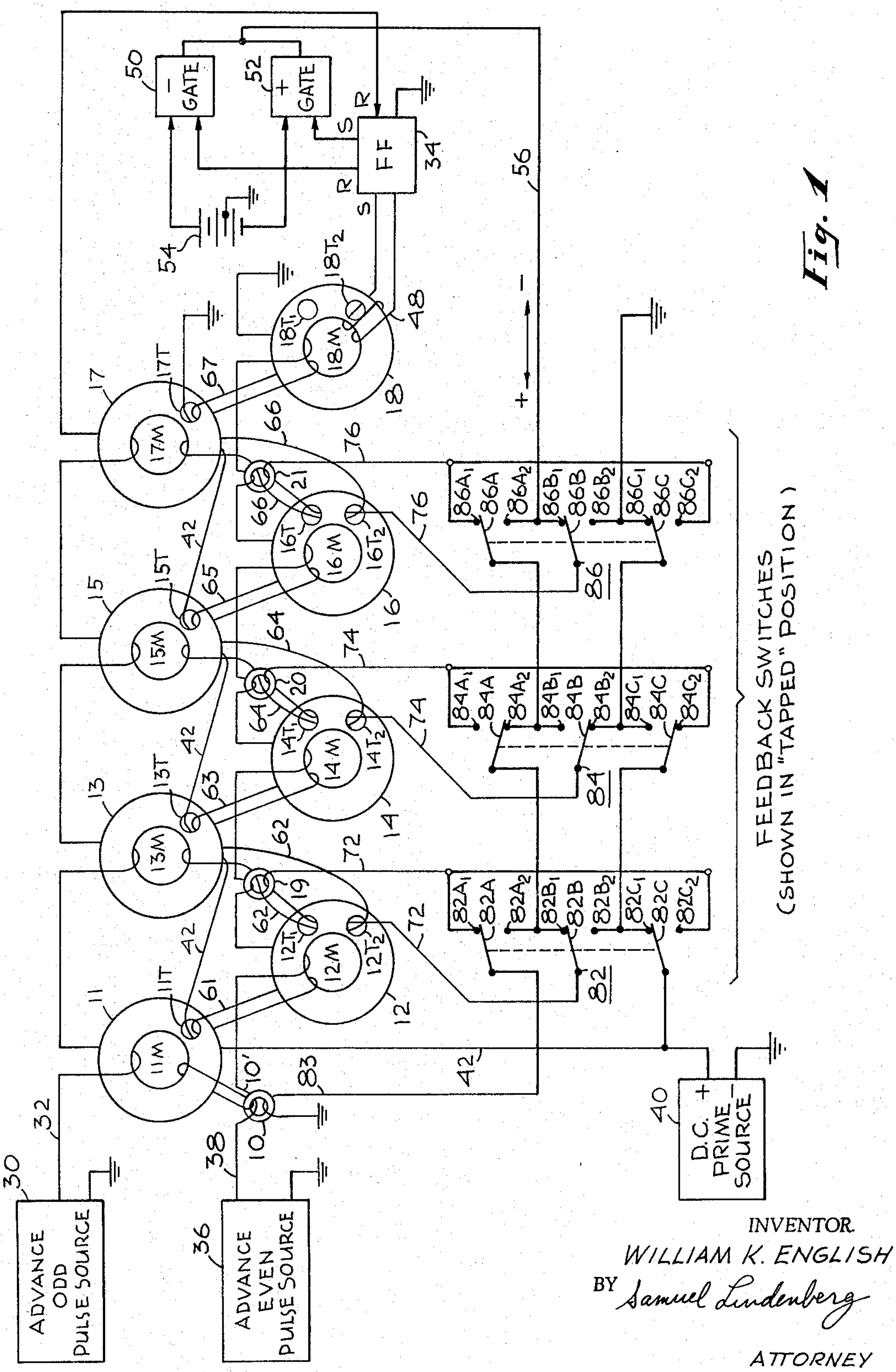
FIGURE 1 is a circuit diagram of a second embodiment of the invention.

Referring now to FIGURE 1, there may be seen a programable feedback shift register which is an embodiment of this invention. In the circuit shown in FIGURE 1 there are shown switches for connecting in the circuitry for enabling feedback in accordance with this invention to be achieved. Of course, this is by way of illustration and not to be construed as a limitation, since those skilled in the art will well understand how the switches may be replaced by their equivalent electronic components to achieve rapid selective operation in accordance with the requirements of the circuits with which the register is to be employed. The circuits shown in FIGURE 1 comprises a plurality of shift register stages respectively designated as odd and even stages. The feedback feature is interposed between an even and an odd stage, but again this is by way of example and not to be construed as a limitation. Each stage of the register comprises a multi-aperture magnetic core, respectively 11, 13, 15, 17, designated as odd cores, each of which includes a central main aperture respectively 11M, 13M, 15M, 17M, and a terminal aperture respectively 11T, 13T, 15T and 17T. Each stage of the shift register also includes a multi-aperture core respectively 12, 14, 16, 18, designated as even cores, each of which has a central main aperture respectively 12M, 14M, 16M, and 18M, and two terminal apertures respectively 12T1, 12T2, 14T1, 14T2, 16T1, 16T2 and 18T1, 18T2.

Between each even and odd core in a stage there is provided a small core respectively 19, 20, and 21. This small core is sized so that effectively it constitutes a counterpart of the magnetic material around the terminal aperture which is switched by priming current or by clearing current. That is, as will become more clear subsequently herein, the small cores 19, 20, and 21 are required, when switched, to induce enough voltage for effectively bucking out the voltage which is induced when a terminal aperture is switched, or to set a subsequent core if no bucking voltage is derived at the time of switching from a terminal aperture.

In addition to the small cores between stages, an additional small core 10 of the same type is provided for entering data into the register. This core is coupled to the core 11 by a transfer winding 10 which passes through the main apertures of both cores.

An advance odd pulse source 30 applies current when required, to an advance add core winding 32. This winding successively passes through the main apertures of cores 11, 13, 15 and 17, and provides a sufficient magnetomotive force to drive these cores to their clear state. In addition, the winding 32 drives a flip-flop circuit 34 to its re-set state.

An advance even pulse source 36 applies current when required, to an advance even core winding 38. The advance even core winding successively is coupled to cores, 10, 12, 19, 14, 20, 16, 21, and 18. This winding serves to drive all these cores to their clear states when it is energized.

A source of priming current 40 applies current continuously to a prime winding 42. The prime winding is successively inductively coupled to the apertures 11T, 13T, 15T, 17T. The prime winding serves to prime the respective cores 11, 13, 15, and 17 after they have been driven to their set states as a result of a transfer from the preceding stage. The core 18 is the output core for the register and an output winding 48 is connected to drive a flip-flop 34 to its set state should the winding 48 be energized. Two gates are operated in response to the output of the flip-flop 34. These are respectively designated as the positive gate 50 and the negative gate 52. The negative gate, in response to the re-set output of the flip-flop 34, applies a negative voltage from a center tapped potential source 54 to the bus conductor 56. The positive gate 52 in response to the set output of the flip-flop 34, applies a positive voltage to the bus 56 from the source 54. A positive going current or current in one direction, will flow along the bus 56 in response to the positive voltage and a current in the opposite direction will flow along the bus 56 in response to the negative voltage.

A transfer winding respectively 61, 63, 65, and 67, is provided for coupling each odd core of each stage of the register to the respective succeeding even cores in some respective stages of the register. This transfer winding passes through the terminal aperture of the odd core and then through the main aperture of the even core. A transfer winding respectively 62, 64, 66, inductively couples each even core of the register, the small core and the succeeding odd core of the register. This transfer winding respectively 62, 64, 66, passes through the first and second terminal apertures of an even core of the register with an opposing sense, then through the small core, then through the main aperture of the succeeding odd core of the register. For example, the winding 62 passes down through the terminal aperture 12T2, up through the terminal aperture 12T1, down through the aperture of the core 19 and then down through the main aperture 13M of the core 13 and back to close the transfer loop. Accordingly, assuming a current flow in one direction along the winding 62 it would establish flux directions which are opposite to one another in the magnetic material adjacent the apertures 12T2 and 12T1, the direction of flux in the core 19 would be opposite to the direction of flux around the aperture 12T1 and the direction of the flux around the core 13 is the same as the direction of flux around the core 19.

An auxiliary priming winding respectively 72, 74, 76, is provided for each even core of the shift register. By way of example, the winding 72 passes through the terminal apertures 12T1 and 12T2 with the same coupling sense as the transfer winding 62. The coupling sense with respect to the core 19, however, is in the opposite direction as that of the transfer winding. Each one of the auxiliary prime windings is connected to a triple-pole double-throw switch respectively 82, 84, 86. The switch 82 includes three swinging arms respectively 82A, 82B, and 82C. The arm 82A in one position (that shown) will make contact with the terminal 82A. In the other position it makes contact with a terminal $82A_2$.

The arm 82A is connected to an input winding 83, which is inductively coupled to core 10. The arm 82B in the position shown makes contact with the terminal $82B_1$ in the other position makes contact with terminal $82B_2$. Arm 82C in the position shown, makes contact with terminal $82C_1$ and in the other position makes contact with terminal $82C_2$. The switch 84 is shown in its other operated position whereby the swinger arm 84A contacts terminal $84A_2$, swinger arm 84B contacts terminal $84B_2$, and swinger 84C contacts terminal $84C_2$. The switch 86 is shown operated to the same state as the switch 82 with its respective swinger arms 86A, 86B, and 86C, contacting terminals $86A_1$, $86B_1$, and $86C_1$.

The auxiliary prime winding 72 has one end connected to the swinger arm 82B and the other end connected to contacts $82A_1$ and $82C_2$. The winding 74 has one end connected to the swinger 84B and the other end connected to contacts $84A_1$, and $84C_2$. The auxiliary prime winding 76 has one end connected to the swinger 86B and the other end connected to the contact $86A_1$, and $86C_2$. The prime current source 40 is connected to the swinger 82C. The bus 56 is connected to the contacts $86A_2$ and $86B_1$.

With the switches operated to the conditions shown in the drawing, there is a prime current path provided from the source 40 through the swinger 82C, over to the swinger 84C, up through the auxiliary winding 74 then down through the core 20 terminal apertures 14T1, 14T2 to the swinger 84B. From the swinger 84B the current path then continues through the swinger 86C contact $86C_1$ to ground. Therefore, the only one of the odd cores and small toroidal cores receiving priming current, with the switches in the position shown, is the core 14 and the small core 20.

The bus 56 is connected to the contacts $86A_2$ and $86B_1$. A current path, with the switches in the position shown, is provided through swinger 86B through auxiliary winding 76 down through swinger 86A over to swinger 84A, then through swinger 82B up through the auxiliary winding 72, down through swinger 82A and through input winding 83 then to ground. Accordingly, with the switches in the positions shown, the cores 12 and 19 and cores 16 and 21 will receive priming current of one polarity or the other, depending upon the state to which flip-flop 34 is driven. Also the input core 10 is driven to either its clear or set state by the current flowing from bus 56, depending on the direction of current flow.

The stages of the register which receive priming current from the source 40, operate in the normal manner of stages of a shift register, and do not receive feedback from the last stage of the register. The down position of the switches as exemplified by switch 84, thus prevents feedback from occurring.

Considering now the operation of the register in accordance with this invention. Assume that the magnetic core 11 has been driven to its set state by a current in winding 10 resulting from the advance even pulse source switching core 10. The priming current source 40 operates to prime the core 11 so that upon the occurrence of a current pulse from the advance odd pulse source 30, a transfer current is induced in the transfer winding 61, which drives core 12 to its set state. The advance odd pulse source current which caused the transfer out of core 11, drives the flip-flop 34 to its re-set state if not already there in response to which gate 50 enables a negative going current to flow through the auxiliary priming winding 72. In response to the negative going current the toroid 19 and aperture 12T1 are held in the clear direction and only aperture 12T2 is primed. Accordingly, upon the occurrence of a current pulse on the advance even core line 38, a transfer current will be induced in the transfer winding 62 which will set the core 13. Cores 19 and the magnetic material around the aperture 12T1, do not effect the transfer at this time. The transfer of the state of core 13 to core 14 occurs on the next advance odd pulse interval in the manner described in connection with the transfer of the state of core 11 to the state of core 12.

Because of the position of the switch 84 only positive priming current flows through the priming winding 74. Therefore, the core 14 will be placed in its prime state. Toroid 20 is held in the clear state as is the material around the aperture 14T1. Upon the occurrence of the next advance even core interval, a transfer occurs whereby core 15 is left in its set state.

Upon the occurrence of the next advance odd core interval, a transfer occurs between cores 15 and 16 and core 16 is driven to its set state. Since core 16 is at this time receiving negative current from the pulse gate 50, only aperture 12T2 is primed. Upon the occurrence of the next advance even core interval core 17 is driven to its set state. It then is primed from the D.C. prime current source 40. Upon the occurrence of the next advance odd core interval, a transfer occurs between cores 17 and 18. Core 18 is driven to its set state.

When core 18 is driven to its set state a voltage is induced in winding 48 which sets flip-flop 34. As a result, flip-flop 34 opens the positive gate 52. Positive current then flows along the bus 56 through the auxiliary prime winding 76 and through the auxiliary prime winding 72 and through input winding 83. Positive current sets core 10 so that upon the next clear even pulse interval core 11 is driven to its set state. Negative current would leave core 10 in its clear state so that core 11 is left in its clear state upon the occurrence of the next clear pulse interval.

Consider now what will happen with positive current in the auxiliary prime winding when core 12 has been placed in its set state by a transfer from the core 11. The magnetic material around the aperture 12T1 is primed by the positive current as is also the small toroid core 19. That is, the small toroid core is driven to its opposite state of magnetic remanence or set state. Upon the occurrence of an advance even current pulse on the winding 38 core 12 is driven to its clear state as is also core 19. This results in a cancellation of current induced in the transfer winding 62, whereby core 13 remains in its ZERO representative state. There is no contribution from the magnetic material around aperture 12T2 since the positive priming current holds this material in its clear state.

Assume that core 12 was in its ZERO representative or clear state at the time that an advance even pulse interval occurs. The advance even pulse will cause core 19 to be driven to its clear state from the set state, whereby current flows in the transfer winding 62 which causes core 13 to be driven to its set state. Therefore, the arrangement described acts as a complementing circuit as far as the state of cores 12 and 13 are concerned, or as an exclusive-or circuit as far as the states of cores 12, 19, and 13 are concerned. With a positive priming current the state of the transmitting core is complemented in the transfer. While the arrangement described and shown uses a plus or minus priming current, it can work equally well using a single source of current and two separate prime windings in the core. The source of current can be applied if a ONE is stored in the last core of the register and is not applied if the last core is in the ZERO state. The single winding arrangement is preferred, however.

Figure 2:
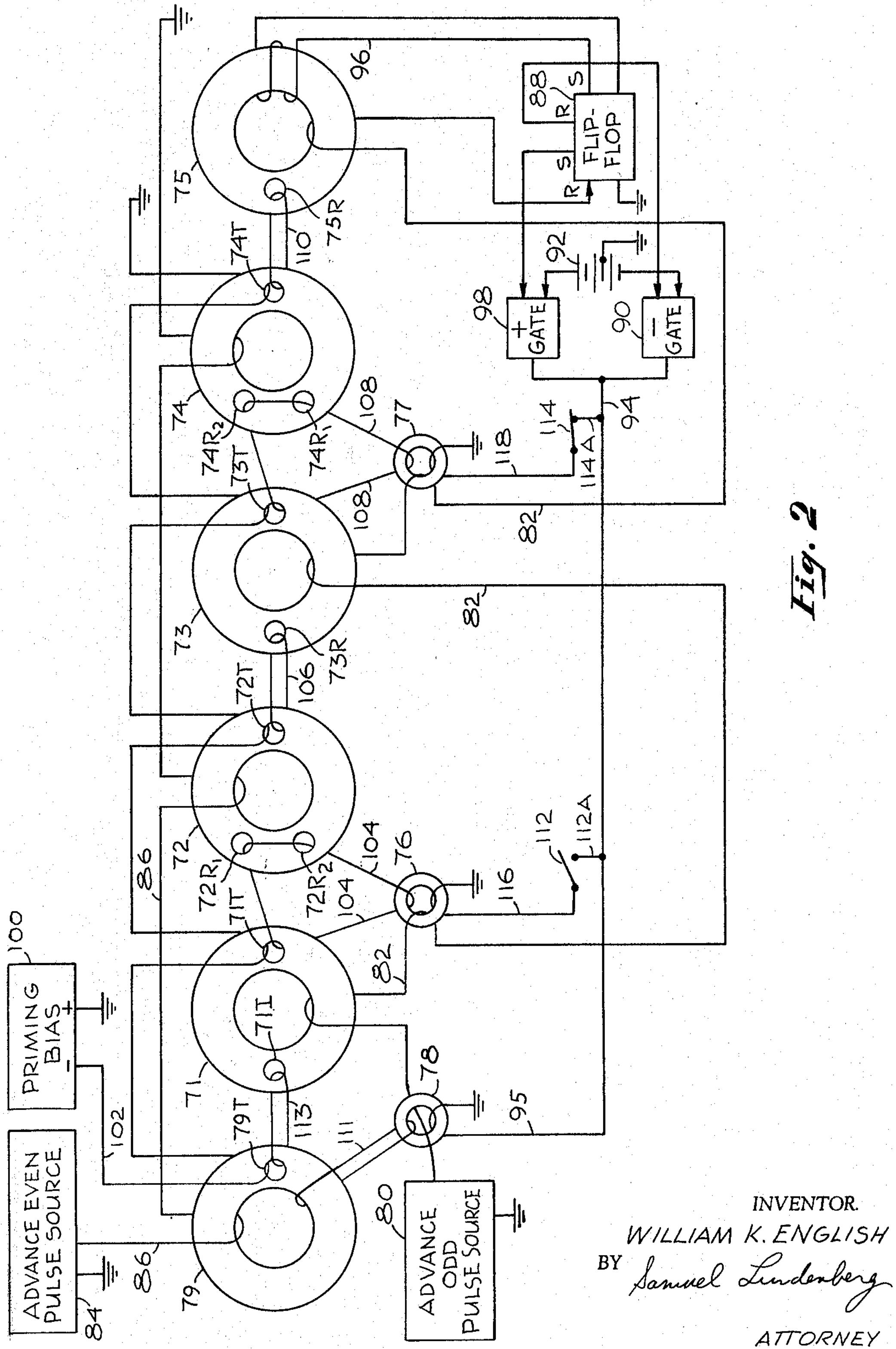
FIGURE 2 is a circuit diagram of a second embodiment of the invention.

Reference is now made to FIGURE 2 which shows an alternative arrangement for an embodiment of the invention. For simplification purposes only five shift register cores are shown. Those well skilled in the art will be easily able to apply the teachings to be shown and described for FIGURE 2, to extending the size of the shift register to any desired length.

The shift register shown in FIGURE 2 has odd cores respectively 71, 73, 75, and even stage cores respectively 72, 74. A small magnetic core respectively 76 and 77 is positioned between the first and second of the cores and between the third and fourth of the cores. In addition, small input core 78 and large input core 79 are provided. The small core 78 is identical with cores 76 and 77 and the large core 79 is identical with cores 71, etc. The small cores 76, 77, 78, bear the same relationship to the large cores, as was described in FIGURE 1. An advance odd pulse source driver 80, applies current pulses to an advance odd winding 82. This winding first passes through aperture of core 78, then through the main aperture of the core 71, then through the main aperture of the small toroid 76, and then through the main aperture of the core 73, then through the main aperture of the core 77 and finally through the main aperture of the core 75. This winding serves to drive the cores to which it is inductively coupled to their clear states. An advance even pulse source 84, applies a current pulse to a winding 86, during the even core clearing intervals. The winding 86 is inductively coupled to the cores 80, 72, and 74, by passing through their main apertures. The winding 82 also serves to drive a flip-flop 88 to its re-set state whereby a negative gate 90 is enabled to apply a negative current from the source 92 to a bus 94. When core 75 is set by a current in winding 110 a voltage is induced in the output winding 96 which drives the flip-flop 88 to its set state. In response thereto, the positive gate 98 is opened whereby, positive going current is applied to the bus 94.

A priming bias source 100 applies priming current to a priming winding 102. This priming winding passes through the output apertures respectively 79T, 71T, 72T, 73T and 74T of the respective cores in the shift register.

A transfer winding 104 is inductively coupled to cores 71, 76, and 72, by passing through the apertures 71T in one sense, through the aperture of the core 76 in an opposite sense, and then through the respective apertures 72R2 and 72R1 with opposite senses. A transfer winding 106 couples the aperture 72T of the core 72 to the input aperture 73R of the core 73. A transfer winding 108 is inductively coupled to aperture 73, the aperture of core 77 and input apertures 74R1 and 74R2 of the core 74 with the same relative senses with respect to these apertures as the winding 104 has to the apertures of cores 71, 76, 72. A transfer winding 110 couples the aperture 74T of core 74 to the input aperture 74R of core 75.

A transfer winding 111 couples input small core 78 to input large core 79. Another input transfer winding 113 couples aperture 79T of core 79 to an input aperture 71T of core 71.

The bus 94 is connected to the two switch contacts respectively 112A and 114A of switches 112 and 114 and also to a winding 95, inductively coupled to core 78. Swinger arms of switches 112 and 114 are respectively coupled to auxiliary priming windings 116 and 118. These auxiliary priming windings are respectively inductively coupled to the cores 76 and 77.

Assume now at the outset, that the core 71 has been driven to its set state. To effectuate this, positive current from the positive gate 98 drove core 78 to its set state. An advance odd current pulse drove core 78 to its clear state, whereupon the voltage induced in transfer winding 111 sets core 79. This core is then primed from the bias source 100. An advance even current pulse clears core 79 and over transfer winding 113 drives core 71 to its set state. Should the negative gate 90 have been initially open, then core 78 would not have been set and core 71 would then remain in its clear state.

By reason of the operation of the priming bias 100 and the priming winding 102 core 71 will be transferred to its primed state. Upon the occurrence of the advance odd pulse from the advance odd pulse source, core 71 is driven to its clear state. Core 76 also is driven in the clear direction, but since it previously was in its clear state, it will be unaffected by this drive. Accordingly, the current in the transfer winding 104 serves only to drive the core 72 to its set state. The transfer which has occurred is that which occurs in a normal shift register. The transfer of the set state of core 72 to the core 73 occurs in the usual manner. Since initially the flip-flop 88 is in its re-set state, negative current is applied to the bus 94 and thereby to the auxiliary priming winding 118. This current serves to maintain the core 77 in its clear state. Therefore, the application of a clearing drive to the core 73 and the core 77 merely results in the usual transfer of the state of core 73 to core 74. There will be a transfer of the set state of core 74 to the core 75 upon the occurrence of the next advance even pulse. Setting core 75 induces a voltage in winding 96 which serves to drive the flip-flop 88 to its set state.

Positive current can now flow through the core 77 driving it to its primed or set state. Assume now that the operation of the register has occurred such that core 73 is in its set state. The flip-flop 88 has just been transferred to its set state whereby, positive current can transfer core 77 to its set state. Upon the occurrence of the next advance odd core interval, core 73 is driven to its clear state in response to which a voltage is induced in the winding 108. However, core 77 is also driven to its clear state in response to which a voltage of equal but opposite polarity is induced in the winding 108. As a result, there is no current and no transfer of the state of core 73 into core 74. Therefore, in response to the clearing drive from the advance odd pulse source 80, a complementing action has taken place.

Assume now that core 73 was in its clear state at the time that the advance odd core interval occurred. The current drive applied to the winding 82 has no effect on core 73, but does serve to drive core 77 to its clear state. Therefore, a current will flow in the transfer winding 108 in response to which the cores 74 will be driven to its set state by the current applied at the aperture 74R1. It should be noted, that previously when the core 77 was maintained in its clear state and the current induced in the winding 108 occurred as a result of the drive applied to the core 73, the core 74 was driven to its set state by the magnetomotive force applied from the aperture 74R2. Once again a complementing operation has occurred.

It should be seen from the foregoing description that again a programable feedback shift register has been described whereby, as desired, feedback can occur which causes a complementing operation in those portions of the shift register to which the feedback signals are applied.

Figure 3:
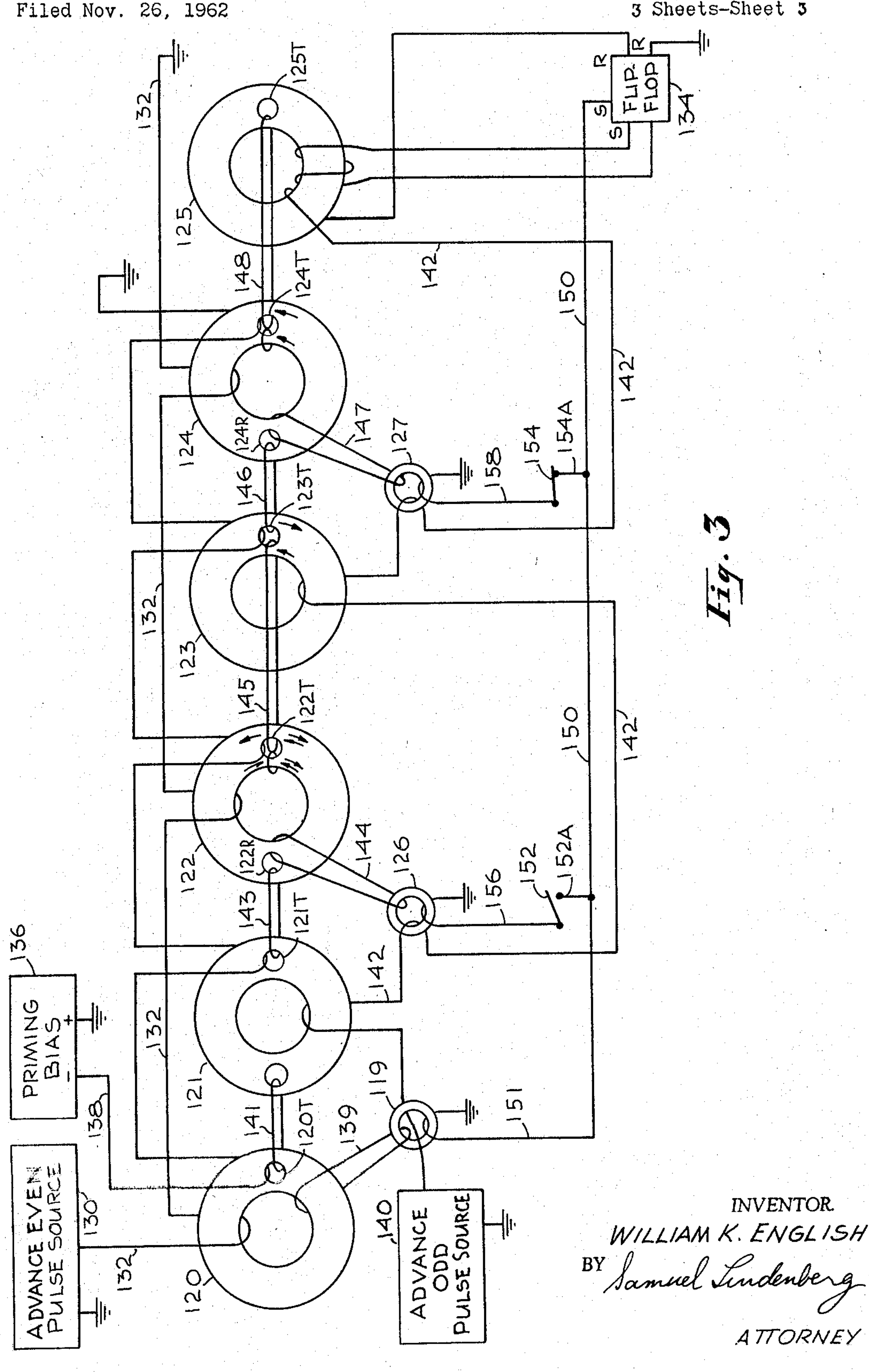
FIGURE 3 is a circuit diagram of still another embodiment of the invention.

FIGURE 3 is a circuit diagram of another embodiment of the invention wherein the circuit is simplified still further. Here the magnetic cores of the shift register respectively comprise input core 120 and register cores 121, 122, 123, 124, and 125. The small toroidal cores are input core 119 and cores 126 and 127 are respectively placed between the cores 121 and 122 and 123 and 124. An advance even pulse source 130 applies current pulses at the even core advance intervals to the even core advance winding 132. This winding is inductively coupled to the respective even cores 120, 122, and 124. A priming bias source 136, applies a priming current to the winding 138. The priming winding 138 is inductively coupled to all the output apertures respectively 120T, 121T, 122T, 123T, 124T, of all of the cores of the shift register. An advance odd pulse source 140 applied advance current pulses during the odd core advance intervals, to a winding 142. This winding is inductively coupled to the cores 119, 121, 126, 123, 127, and 125, for the purpose of driving all these cores to their clear states. Winding 141 also drives flip-flop 134 to its re-set state. A transfer winding 139 couples core 119 to core 120. A transfer winding 141 couples core 120 to core 121. A transfer winding 143 is inductively coupled between the output aperture 121T and the outer leg of the input aperture 122R. A second transfer winding 144 is inductively coupled between the small toroid 126 and the inner leg of the input aperture 122R. Another transfer winding 145 is inductively coupled between the output aperture 122T and the inner leg of aperture 123T.

A transfer winding 146 is inductively coupled between the output aperture 123T and the outer leg of the input aperture 124R. Another transfer winding 147 inductively couples the small toroid 147 to the inner leg of material adjacent the aperture 124R. Another transfer winding 148 inductively couples the output aperture 124T to aperture 125T. The flop-flop 134 has its set output connected to a bus 150. The bus is connected to the contacts respectively 152A and 154A of the switches 152 and 154, and also to a winding 151 coupled to core 119. Switch 152 is shown in its open condition and switch 154 in its closed condition. An auxiliary priming winding 156 is inductively coupled to core 126 is connected to the switch 152 which when operated, connects the auxiliary priming winding to be driven by the set output from the flip-flop 134. A second auxiliary priming winding 158 is connected to the switch 154 which when closed can also apply the set output of the flip-flop 134 thereto.

With the switch 154 closed and switch 152 open, whenever the flip-flop 134 is driven to its set state, the only cores that will be effected in response thereto, are the cores 127, and 119. These cores are driven to their set or prime state in response to the output of the flip-flop. With the switch 152 open, the transfer between cores 121 and 122 occurs in normal fashion since there is no contribution from the core 126. This core is maintained in its clear state.

Until the flip-flop 134 is operated it remains in its re-set state and therefore neither core 119 nor core 127 is affected thereby, and any transfers occurring between cores 123 and 124, occur in the normal fashion via the transfer winding 146.

Consider now the situation which occurs when the core 125 is driven to its set state. A voltage is induced in the output winding which drives flip-flop 134 to its set state. This applies a current to the bus 150 which serves to drive the core 127 and the core 119 to their set states. Now should the core 123 have been in its set state, upon the occurrence of a subsequent clear odd pulse then the current pulse applied to the winding 142 drives cores 119, 123 and 127 to their clear states. This causes currents to flow in the transfer windings 139, 146, and 147. This effectively causes core 124 to be completely saturated in the opposite direction to its clear state. Since the core is completely saturated in one direction, no priming can occur and core 124 is effectively in a ZERO state.

Consider now the situation which arises when just prior to the occurrence of an advance odd pulse from the source 140, core 120 is in its primed state, the core 123 is in its clear state, and the core 127 has been placed in its prime state. On the occurrence of the odd current pulse, core 121 is driven to its set state, core 123 is left relatively unaffected and no current is induced in the transfer winding 146. However, core 127 is driven to its clear state, in response to which a current is induced in the winding 147, whereby the core 124 is driven to its set state.

Accordingly, a complementing action has occurred and the embodiment of the invention shown in FIGURE 3 also operates as a programable feedback register, where feedback may be accomplished by operation of switches to cause a complementing action at the locations to which the feedback current is selectively applied.

Accordingly, there has been described and shown herein a novel, useful and simple circuit arrangement for effectuating in a magnetic core shift register a feedback operation which at the locations to which such feedback is applied, operates to provide a complementing action.

I claim:

1. A shift register including a plurality of successive cores and a last core, each core comprising magnetic ferrite core having a set state of magnetic remanence and a clear state of magnetic remanence, means for alternately applying magnetomotive drive to the odd cores in the successive cores of said register and then to the even cores in the successive cores of said register for transferring the state of remanence of preceding cores to succeeding cores in said register, means for obtaining a complementary transfer of states of remanence between two adjacent cores of said register, said means including an auxiliary magnetic core having a clear and set state of magnetic remanence, means responsive to an output from one of the cores of said register for driving said auxiliary core to its set state of magnetic remanence, means for applying magnetomotive force to said auxiliary core and to the preceding one of said two cores to drive them to their clear states of magnetic remanence simultaneously, and means for inductively coupling said two adjacent cores in said register and said auxiliary core for driving the succeeding one of said two cores to its set state in response to said magnetomotive force being simultaneously applied to the preceding core and to said auxiliary core when one of said auxiliary and preceding cores is in its set state at the time of said drive, and to leave said succeeding core unaffected when both of said cores have been placed in their set states at the time of said drive.

2. In a shift register having a plurality of magnetic ferrite cores each having a set state of magnetic remanence and a clear state of magnetic remanence, means for effectuating a complementary transfer of states between a preceding core and a succeeding core, comprising an auxiliary magnetic core, said auxiliary magnetic core having a clear and set state of magnetic remanence, an auxiliary priming winding coupling said preceding core and said auxiliary core, means responsive to an output from a core in said register for applying current to said auxiliary priming winding for priming said preceding core if in its set state and for placing said succeeding core in its set state, means for driving said preceding core and said auxiliary core to their clear states, and transfer winding means inductively coupling said preceding core, said auxiliary core and said succeeding core with a sense to oppose in said winding currents induced by simultaneously driving said preceding core and said auxiliary core to their clear states.

3. In a shift register having a plurality of magnetic ferrite cores, each having a set state of magnetic remanence and a clear state of magnetic remanence, means for effectuating a complementary transfer of states between a preceding and a succeeding core, comprising an auxiliary magnetic core, said auxiliary magnetic core having a clear and set state of magnetic remanence and means responsive to an output of the last stage of said register for driving said auxiliary core to its set state, means for inductively coupling said preceding core to said succeeding core for applying to said succeeding core a drive to its set state when said preceding core is driven to its clear state, and means for coupling said auxiliary core to said succeeding core for applying a drive to said succeeding core to cancel the drive from said preceding core when said auxiliary core is driven from its set state to its clear state simultaneously with the drive applied to said succeeding core.

4. A shift register as recited in preceding claim 3 wherein said succeeding core has a main aperture and an input aperture, said means coupling said preceding core to said succeeding core comprises a winding inductively coupling said preceding core to the magnetic material between said input aperture and the outer periphery of said succeeding core, and said means coupling said auxiliary core to said succeeding core comprises a winding inductively coupling said auxiliary core to the magnetic material between said input aperture and said main aperture.

5. In a shift register of the type comprising a plurality of magnetic ferrite cores each core being capable of being driven from a clear state of remanence to a set state of remanence, each core being coupled to a succeeding core by a transfer winding which is wound through a terminal aperture in a preceding core and then through a terminal aperture in a succeeding core, and including means for applying clearing drives alternately to alternate cores of said shift register for transferring the state of remanence of the cores being cleared to the remaining cores, the improvement comprising means for effectuating a complementary transfer between two adjacent cores of said shift register comprising an auxiliary magnetic core having a clear state and a set state of magnetic remanence, means for driving said auxiliary magnetic core to its set state of magnetic remanence responsive to an output from the last stage of said shift register, means for driving said auxiliary core to its clear state simultaneously with a drive to its clear state being applied to the preceding one of two adjacent cores, and winding means coupling said auxiliary magnetic core to said succeeding core through its terminal aperture for canceling the affect of a transfer from said succeeding core when it is driven from its set to its clear state simultaneously with the drive being applied to said auxiliary magnetic core and for driving said succeeding core to its set state when there is no opposing drive from said preceding magnetic core.

6. In a shift register as recited in claim 5 wherein each of said means for effectuating a complementary transfer between two adjacent cores of said shift register includes a winding coupled to said auxiliary core, and a selectively actuatable switch means for connecting said winding when actuated to a closed position to said means responsive to an output from the last core of said register for driving said auxiliary core to its set state.

7. In a shift register of a type having a plurality of magnetic cores each of which has a clear state of magnetic remanence and a set state of magnetic remanence and there are means for applying drives alternately to alternate cores in said shift register for transferring the state of remanence of the cores being driven to the remaining cores, the improvement comprising an arrangement for effectuating a complementing transfer between two adjacent magnetic cores of said shift register, said improvement comprising an auxiliary magnetic core having clear state and set state of magnetic remanence, means responsive to an output from the last core of said shift register for driving said auxiliary core to its set state, said preceding one of said two adjacent cores having an input aperture and two output apertures, said succeeding one of said two adjacent cores having an input aperture, means for applying a drive to said preceding core and to said auxiliary core for simultaneously driving them from their set to their clear states, and a transfer winding coupling said preceding core and said auxiliary core to said succeeding core by passing through the two output apertures of said preceding core, through the aperture of said auxiliary core and through the input aperture of said succeeding core with a sense to prevent said succeeding core from being driven to its set state when both said auxiliary core and said preceding core are driven from their set to their clear states and to drive said succeeding core to its set state when only said auxiliary core is driven from its set to its clear state.

8. In a shift register as recited in claim 7 wherein said means responsive to an output from the last core of said shift register for driving said auxiliary core to its set state includes a source of positive current flow, a source of negative current flow, a winding passing through the two output apertures of said preceding core with an opposite sense and through the aperture of said auxiliary core, switch means having an operative and an inoperative position, and means responsive to an output from the last core of said register for connecting one of said sources of current flow to said switch means.

9. In a shift register of a type having a plurality of magnetic cores each of which has a clear state of remanence and a set state of remanence and there are means for applying a magnetomotive drive alternately to alternate ones of said cores for effectuating a transfer of the state of magnetic remanence from the ones of said cores being driven to the remaining ones of said cores, the improvement comprising an arrangement for effectuating a complementing transfer when desired, between two adjacent stages of said register, said means comprising a toroidal core having a clear and a set state of magnetic remanence, the preceding one of the two cores of said shift register having a central aperture and a first and second output aperture, the succeeding one of said two cores in said shift register having a central aperture, a priming winding means passing through said two output apertures of said preceding core with an opposite sense to one another and then passing through said auxiliary core, means including a first switch means operative for applying a current to said priming winding means responsive to an output from the last stage of said register for effectuating a priming operation at one of the two output apertures of said preceding one of said two cores, and for driving said auxiliary core to its set state, means for applying a drive to its clear state to said preceding core and to said auxiliary core, transfer winding means for coupling said preceding core and said auxiliary core by passing through the two apertures of said succeeding core, through the aperture of said auxiliary core, and through the aperture of said succeeding core, with a sense to oppose outputs from said succeeding core and said auxiliary core when they are being simultaneously driven from their set to their clear states whereby said succeeding core remains in its clear state of remanence and to drive said succeeding core to its set state of remanence when said auxiliary core alone is driven from its set to its clear state, and means including a second switch means operative when said first switch means is inoperative for applying a current to said priming winding means where said switches is operated in a direction to maintain said auxiliary core in its clear state and to prime the other of said two output apertures of said preceding core when said preceding core is driven to its set state, whereby when said preceding core is driven to its clear state said succeeding core will be driven to its set state.

References Cited by the Examiner

UNITED STATES PATENTS

| | | | |
|---|---|---|---|
| 3,083,355 | 3/1963 | Engelbart | 340—174 |
| 3,112,409 | 11/1963 | Engelbart | 307—88 |
| 3,163,854 | 12/1964 | Engelbart | 340—174 |

BERNARD KONICK, *Primary Examiner.*

S. URYNOWICZ, *Assistant Examiner.*